Oct. 13, 1970  H. SUSSMAN  3,533,269

MANUFACTURE OF METAL OBJECTS

Filed Nov. 21, 1966  4 Sheets-Sheet 1

INVENTOR:

HENRI SUSSMAN

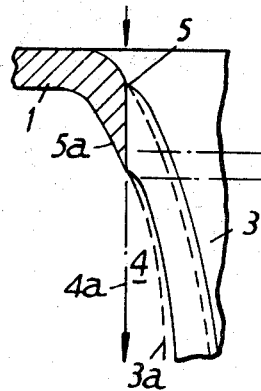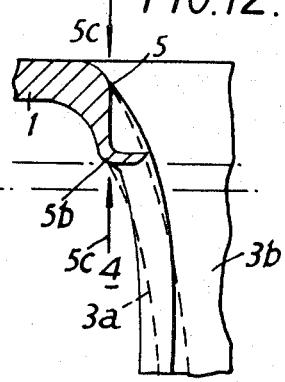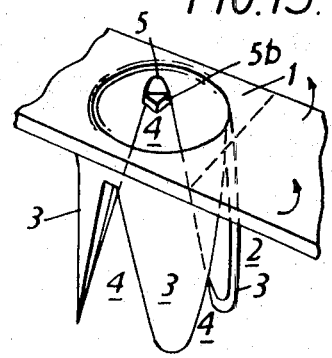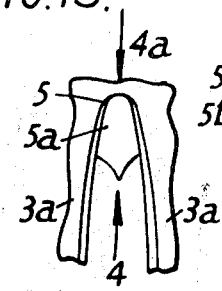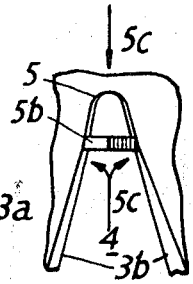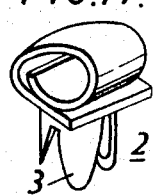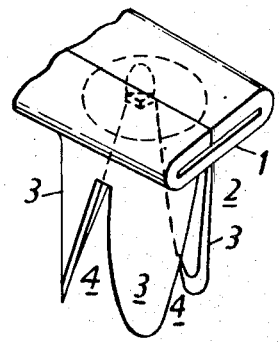

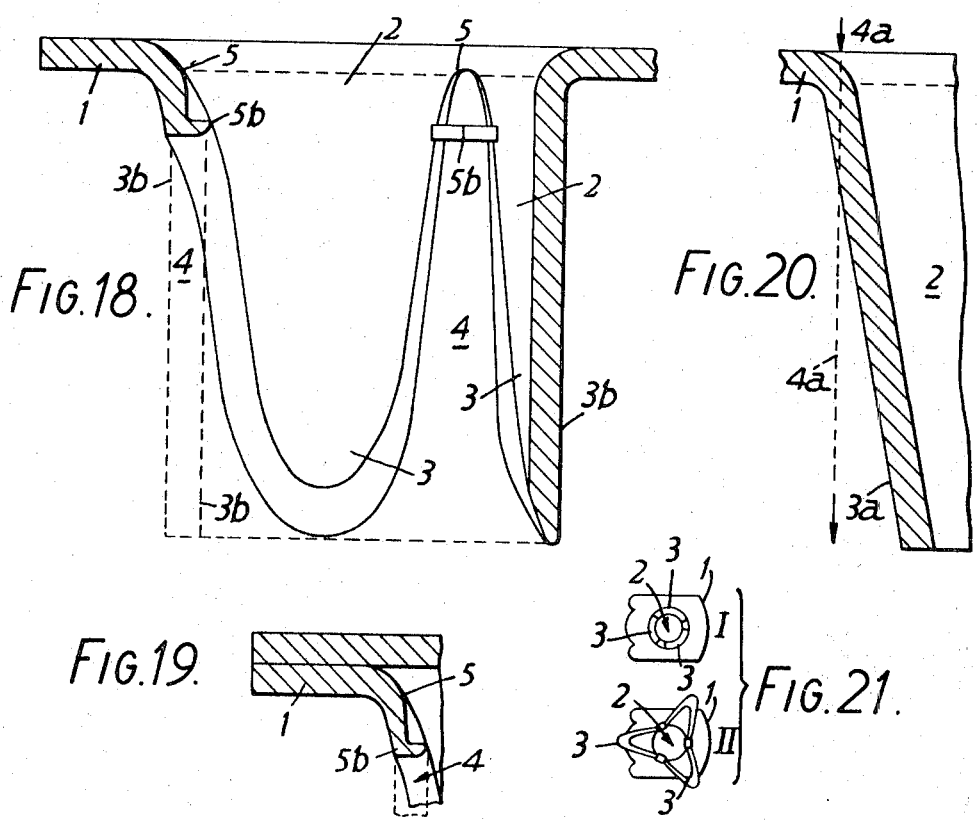

Oct. 13, 1970  H. SUSSMAN  3,533,269
MANUFACTURE OF METAL OBJECTS
Filed Nov. 21, 1966  4 Sheets-Sheet 4
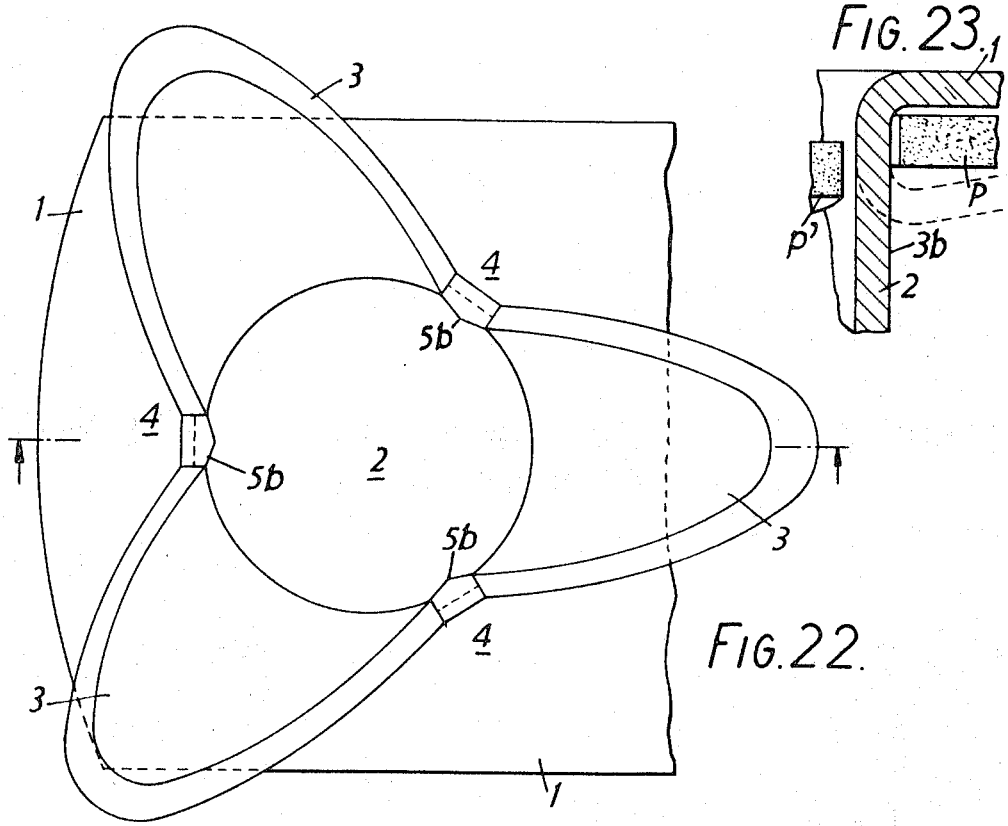
FIG. 22.
FIG. 23.
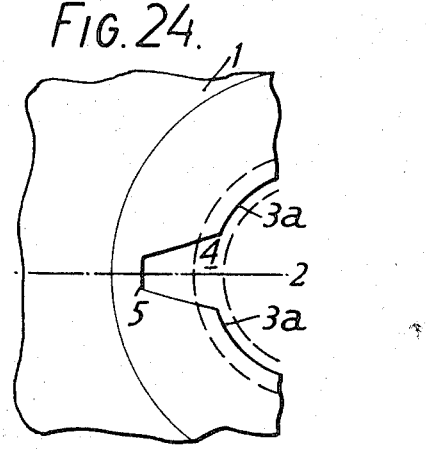
FIG. 24.
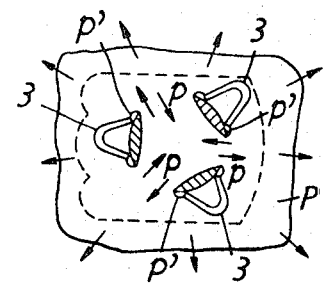
FIG. 25.
INVENTOR:
HENRI SUSSMAN

United States Patent Office

3,533,269
Patented Oct. 13, 1970

3,533,269
MANUFACTURE OF METAL OBJECTS
Henri Sussman, 278 Avenue de la Capelette,
13-Marseille-10, France
Filed Nov. 21, 1966, Ser. No. 596,021
Claims priority, application France, Nov. 23, 1965,
21,200; Sept. 19, 1966, 21,577
Int. Cl. B21d 28/24, 31/02; B21c 37/02
U.S. Cl. 72—324                                  2 Claims

ABSTRACT OF THE DISCLOSURE

A fastener is provided with a base integral with a hollow stem terminating in a tubular lower portion, and a plurality of spaced teeth thereon have a chamfer at the junction between the teeth, each said chamfer being bent over to prevent the edge thereof forming a cutting edge.

---

This invention relates to the attachment of an article, such as a button, to a flexible supporting surface, such as a part of a garment, a shoe, or a piece of headgear.

It has been found that when the material to which the object is secured possesses or acquires a certain elasticity, and the object is affixed to the material by means of a compact single stem which passes through the said material through a single perforation, this perforation can become enlarged by use and the object can slip through it.

On the other hand, it has been found that if the object is affixed to the material by means of a number of teeth each of which has a comparatively small cross section and passes through its own individual perforation, as shown in FIG. 25, so that the teeth pass through a plurality of small individual perforations, each being quasi-linear and of small dimensions and separated from the other perforations by imperforate parts of the material, in place of a "large single hole" constituting the perforation in the latter, then the internal tensions are transmitted in all directions by the said intact portions, and do not enlarge the small individual perforations.

The present invention relates to a process for the manufacture of metal objects each provided with at least one hollow open or closed-end stem, the shape of the said stem being tubular and the stem being provided with at least two teeth for the purpose of securing it to a flexible or elastic sheet, each tooth requiring a separate perforation to enable it to pass through the material to which the object is secured, the said perforation thus being separated from these required for the remaining tooth or teeth by an imperforate portion of the said sheet of material.

According to the present invention a process for making fasteners having a securing stem comprises the steps of providing a strip of metal, progressively deforming said strip perpendicularly to obtain at least one truncated shaped depression constituting said stem, removing the bottom of said stem to form a truncated structure open at both ends with side walls converging towards the bottom thereof, cutting spaced teeth in said stem perpendicularly to said strip and axially in one direction with respect to the stem so as to give each tooth a shape corresponding to a generatrix of said stem with a chamfer at the juncture between said teeth, separating said teeth so as to arrange them in tubular fashion, and bending said chamfer axially in the opposite direction to prevent the edge thereof acting as a cutting edge.

The succession of operations are carried out in passes axially with respect to the stem.

The teeth are formed substantially up to said strip, each cut being made in an axial pass in a surface oblique with respect to the axis of the stem. The cut results in a chamfer. Subsequently, by a new series of operations in an axial direction, and with the use of suitable tools, the said chamfer is bent over, either externally or internally or in any other manner, in order to convert it into a wider and flatter non-cutting edge.

The production is completed by others series of operations, with the use of suitable tools and, again, in axial passes, such as: the production of the parts forming a neck, a head flange, or overlapping portions, if any are required, and any other parts; the cutting and separation of the finished object or objects at an intermediate stage.

Further, according to the present invention, a fastener comprises a hollow stem, a base member integral therewith, said stem terminating in a tubular lower portion, a plurality of spaced teeth on said portion with a chamfer at the junction between the teeth, said chamfer being bent to prevent the edge thereof from acting as a cutting edge.

An embodiment is described with reference to the accompanying drawings.

In these drawings:

FIG. 1 relates to the working of the strip of metal by successive axial operations, the first 14 shaping operations being shown in elevation, after which the 15th and 16th shaping operations are shown as a plan view, as well as the 17th, which corresponds to the operations of cutting out the object, the latter being finally shown, in its finished state, in elevation; the stages through which the manufacturing process passes after the 17th shaping operation are not illustrated, being replaced by a double arrow.

FIGS. 11 and 12 are enlarged views of a part of FIGS. 4 and 6 respectively.

FIGS. 13 and 14 show, as seen from the interior of the stem, the parts illustrated in section in FIGS. 11 and 12 respectively.

FIGS. 15–17 show alternative methods of sealing the upper opening of the stem, i.e. FIG. 15 shows how it can be sealed up by bending over a single portion in the direction shown by the arrows; FIG. 16 shows how it can be sealed up by folding over two portions symmetrically; FIG. 17 shows how it can be sealed up by the folding over of a portion which first of all forms the head of the bushing and then the sealing device.

Figure 6:
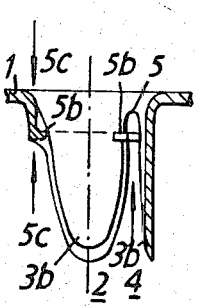
Figure 7:
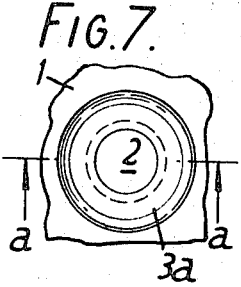
FIGS. 7–10 are plan views of FIGS. 3, 4, 5 and 6 respectively.

FIG. 18 is an enlarged view of FIG. 6.

FIG. 19 shows part of FIG. 18 in cases in which the stem is sealed by folding over two lateral overlapping portions.

Figure 3:
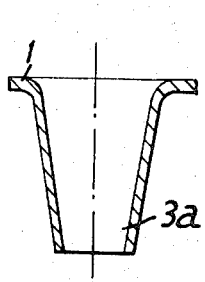
FIGS. 3–6 are enlarged axial sectional views of the stem shown in stages 8, 9, 10 and 11 respectively of FIG. 1.
Figure 4:
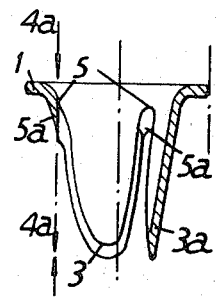
Figure 5:
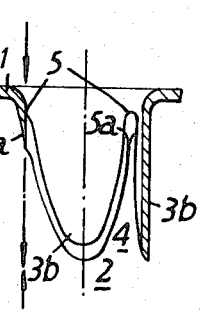

FIG. 20 is an enlarged view of part of FIG. 3.

Figure 1:
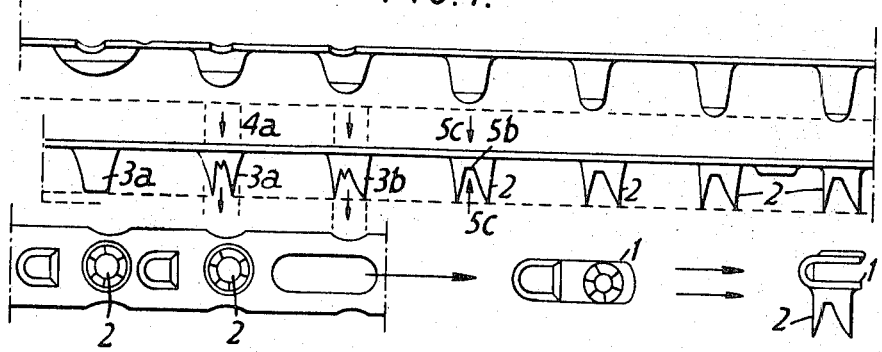
Figure 2:
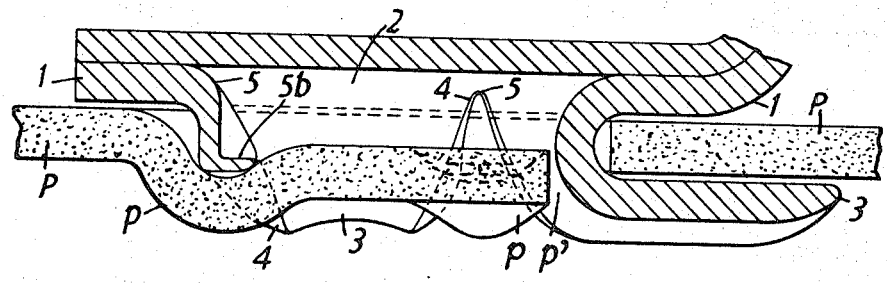
FIG. 2 is an enlarged view of the stem shown in FIGS. 6 and 10, placed on a flexible sheet of material, its teeth being bent in order to affix the stem to the material so that it cannot be torn away.

FIG. 21 shows the finished hook at the end of the series of operations illustrated in FIG. 1, seen from below, in Part I; in Part II, the teeth of the same hook seen from below are bent over as when the hook is affixed to the flexible sheet of material, as shown in FIG. 2.

FIG. 22 is an enlarged view of Part II of FIG. 21, but the hook has been adjusted in its orientation by half a rotation.

FIG. 23 shows part of FIG. 2, but the tooth situated in this part has not yet been bent over; the dotted lines indicate the position which will be occupied by the tooth when it has eventually been bent over.

Figure 8:
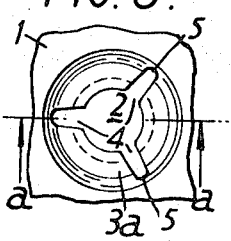
Figure 9:
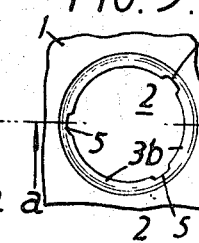
Figure 10:
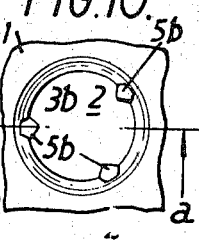

FIG. 24 is an enlarged view of part of FIG. 8.

FIG. 25 is a view, from below, of the hook affixed to the flexible sheet of material, the teeth being bent over.

The reference numbers in these drawings are as follows: 1: the base forming the starting point, in the object, of the hollow stem 2 with tubular walls shaped into teeth 3, which are separated by empty spaces 4 formed by the cuts made in the stem when it was in the truncated cone stage 3a, each cut having a starting point 5.

The starting point 5, likewise effected by an operation along the line 4a, takes the form of a cutting chamfer 5a, after which it is bent into the shape 5b, again by an axial operation orientated along the arrows 5c, the upper tool descending, and the lower tool ascending or remaining motionless in order to function as a support.

The drawings show how each tooth 3 passes by means of an individual perforation through the portion corresponding to it in the vertical direction and situated between two parts *p* of the sheet of material P.

FIG. 1 shows the various stages through which the stem passes in course of manufacture, and through which pass certain other parts of the object equipped with the said stem, these stages being effected by successive operations carried out by means of so-called "follow-up tools," all the operations taking directions axial with respect to the stem, so that they can be carried out very rapidly by entirely mechanical and automatic means, these operations being as follows:

a number of progressive operations for the production of the open truncated cone 3a;

the subsequent production of the cuts in the truncated zone, starting at point 5, which produces the chamfer 5a;

the cylindrical arrangement of the parts remaining after the cutting operation (cylindrical shape 3b);

the bending in order to obtain the fold 5b, of the chamfer 5a of each initial cut;

subsequently, the final shaping and cutting operations or the production of an intermediate stage which, by a reprocessing machine, will be given the final shape required.

The drawings show that each cut has been effected in the stem in the truncated cone stage 3a, opening out towards the base, the entire cut forming a very acute angle, whereas the latter becomes less acute when the stem is arranged cylindrically, as shown by 3b.

It will be seen that the extent to which the flexible sheet of material P is traversed by the teeth 3 is limited.

The process to which the invention relates enables the hollow stem of a metal object to be provided in an economical manner, and merely by means of operations carried out in an axial direction, and with two or more teeth.

What is claimed is:

1. Process for making fasteners having a securing stem comprising providing a strip of metal which resists manual bending operations; progressively deforming said strip perpendicularly to obtain at least one truncated shaped depression constituting said stem; removing the bottom of said stem to form a truncated structure open at both ends with side walls converging towards the bottom thereof; cutting spaced teeth in said stem perpendicularly to said strip and in one axial direction with respect to said stem so as to give each tooth a shape corresponding to a generatrix of said stem with a chamfer at the juncture between said teeth; separating sadi teeth so as to arrange them in tubular fashion; upsetting said chamfer axially in the direction opposite said one axial direction to bend said chamfer to prevent the same from forming a cutting edge.

2. Process according to claim 1, wherein said teeth extend substantially up to said strip.

References Cited

UNITED STATES PATENTS

| | | | |
|---|---|---|---|
| 183,878 | 10/1876 | Young | 72—325 |
| 203,675 | 5/1878 | Tucker | 72—379 |
| 393,721 | 11/1888 | Revol | 72—325 |
| 649,762 | 5/1900 | Saltzkorn et al. | 72—325 |
| 799,925 | 9/1905 | Murphy | 72—379 |
| 3,279,235 | 10/1966 | Olson | 72—379 |

CHARLES W. LANHAM, Primary Examiner

E. M. COMBS, Assistant Examiner

U.S. Cl. X.R.

72—379